Feb. 4, 1969  F. SCHLOSS  3,425,265

MINIATURE MECHANICAL IMPEDANCE HEAD

Filed Nov. 30, 1965

INVENTOR.
FRED SCHLOSS
BY
ATTY.

United States Patent Office 3,425,265
Patented Feb. 4, 1969

3,425,265
MINIATURE MECHANICAL IMPEDANCE HEAD
Fred Schloss, Arlington, Va., assignor to the United States of America as represented by the Secretary of the Navy
Filed Nov. 30, 1965, Ser. No. 510,711
U.S. Cl. 73—67.1
Int. Cl. G01n 29/00; G01m 7/00
7 Claims

ABSTRACT OF THE DISCLOSURE

A mechanical impedance measuring device having a pedestal supported acceleration element mounted to respond to inertial bending and a force responsive element also mounted to respond to bending of the support member attached to the specimen whose impedance is being measured. The two sensors are electrostatically separated and the assembly is capable of being constructed to measure mechanical impedances of the order of one gram or less.

---

The invention described herein may be manufactured and used by or for the Government of the United States of America for governmental purposes without the payment of any royalties thereon or therefor.

This invention relates to a miniature mechanical impedance device. More specifically the device includes an acceleraton sensing element and a force sensing element mounted together for measuring the mechanical impedance of very small and light test structures.

Prior impedance measuring devices have had the disadvantages that they were too large to be used with small models and were likely to stiffen the model with the result that it was not possible to get realistic measurements from small models using these known impedance measuring devices. Furthermore, to permit the use of the device with thin walled models, it is desirable to construct the device to have as little mass as possible between the force sensing element and the specimen being measured.

It is an object of this invention to provide an impedance measuring device for use with small structures.

It is the object of this invention to provide an impedance device having a very small mass.

Other objects and many of the attendant advantages of this invention will be readily appreciated as the same becomes better understood by reference to the following detailed description of a preferred embodiment thereof when considered in connection with the accompanying drawings wherein.

Figure 1:
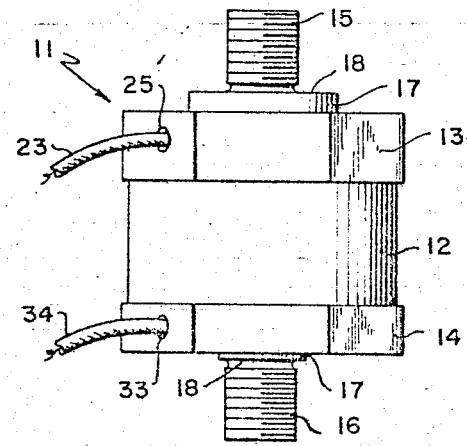
FIG. 1 is a perspective view of the device of this invention.

Referring now to the drawing wherein like or corresponding reference numerals designate like parts, in FIG. 1 is shown a mechanical impedance measuring device 11 which includes a cylindrical body portion or body member 12 and two end portions 13 and 14, respectively, providing closures for the opposite ends of the body portion 12. Each of the end pieces is supported along its respective peripheral edge by body portion 12 and is provided with means for attachment either to the source of vibration energy (not shown) or to the specimen the impedance of which is being measured. This attachment means may be a threaded member, as 15 and 16 in FIG. 1, or in some cases may be made with cement or any other appropriate fastening means. In the preferred embodiment, each of the end pieces is provided with a reduced portion 17 having a shoulder 18 which bears on the specimen being tested or on the base of the source of vibration depending of course on the selected orientation for the device and the threaded portions 15 and 16. It is desirable to have a shoulder such as 18 to minimize the stiffening effect of the attachment of the impedance device to the specimen while providing the necessary good contact for the transmission of the force from the source of vibrating energy or shaker. The shoulder enables flexing or bending (e.g. elastic bending) of the portion 14 to which the force measuring transducer is attached.

Figure 2:
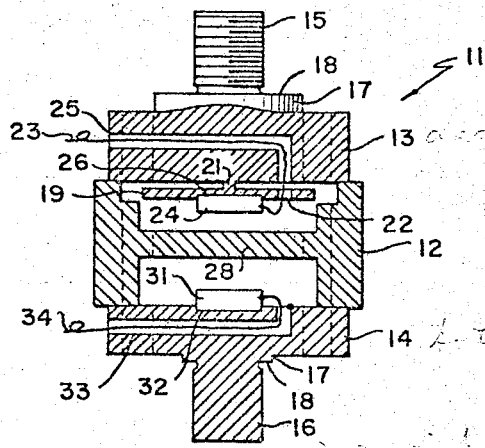
FIG. 2 is a sectional view through the device of FIG. 1 along line II—II.
Figure 3:
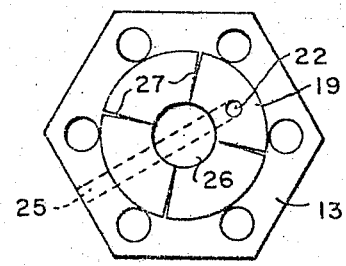
FIG. 3 is a plan view of one end piece of the invention.
Figure 4:
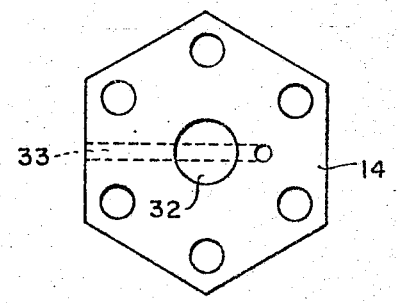
FIG. 4 is a plan view of the other end piece of the invention.

Referring now to FIG. 2 for a more detailed description of the construction of the device of the invention, the closure member 13 is constructed to assume the form of an accelerometer having a disc member 19 supported by a pedestal 21, the pedestal being attached to or carried by the closure member 13. Closure member 13 contains an opening or passage 22 therein through which a lead 23 is attached to a sensing element 24 which may be of a piezoelectric material or of other strain responsive material. The lead 23 extends through the opening 22 and a bore 25 in closure member 13, bore 25 extending or passing substantially across a diameter of the element 13 to prevent disturbing the symmetry and balance of the device. The piezoelectric element 24 is, in the preferred embodiment of the invention, a thin disc mounted in a counter bore 26 in disc member 19, as by cementing. The disc member 19 may be slotted as shown at 27 in FIG. 3 to increase the sensitivity of the accelerometer. The disc member 19 and pedestal 21 constitute a strain filter to prevent strains directly due to the force being sensed by the accelerometer. The pedestal 21 in this preferred embodiment is made integral with the elements 13 and 19 but may be made in other ways so long as the connection is sufficiently rigid.

The body member 12 is substantially a hollow cylinder with a webbed portion 28 which serves to electrostatically separate the accelerometer 13 from the force sensing element 14. The end pieces 13 and 14 are held to the ends of the body member 12 in the preferred embodiment by a plurality of small bolts (no reference numerals) passing through a bore in end piece 13 and body member 12 and being threadedly engaged in end piece 14.

The force sensing element 14 is constructed by mounting a piezoelectric element 31 in a recess 32 in the element 14. There is also provided in element 14 a bore 33 through which a lead 34 is passed to attach it to the piezoelectric element 31. This bore 33 is also constructed along the diameter of the element 14 to avoid distorting the dynamic balance of the device, as was bore 25. Element 31 is designed to match the piezoelectric element 24. This matching of the piezoelectric elements 24 and 31 as to size, weight and response to minimize the effects of transverse forces on the impedance device and to insure that both elements have substantially the same time constants thus to prevent the introduction of substantially any relative phase shift in their outputs at low frequencies. Said piezoelectric elements 24 and 31 are smaller than the interior of the cylindrical body member 12 to permit flexing of the crystals 24 and 31, with the bending of their respective support members to which they are attached. By flexing or bending is meant the relative displacement of one portion of the member and, in this case, within the elastic limits. This is in contrast to the prior art wherein compressional force was employed to produce the electrical output of the system. The preferred method of mounting the crystals, as described above and shown in FIG. 2, eliminates the need for a compressive mass and thereby reduces the total mass of the device, which is one of the objects of the invention, and also provides for coaxial alignment of the crystals. Further, by mounting the crystals as shown they are not subject to transverse components of the force applied to the system.

It is to be understood that the device may be constructed of any suitable materials, in the preferred embodiment the elements 13 and 14 are constructed of titanium and the element 12 of aluminum to provide strength and lightness of construction. Magnesium has also been used for elements 13 and 14. The piezoelectric elements, which are normally of dense material, are made as thin as practical to reduce the overall weight of the device.

In normal operation the force measuring element 14 is attached to the model or device whose impedance is being measured and the accelerometer element 13 is attached to the source of vibrating energy. The outputs of the accelerometer and force measuring elements are connected to appropriate amplifying measuring circuits (not shown).

Figure 5:
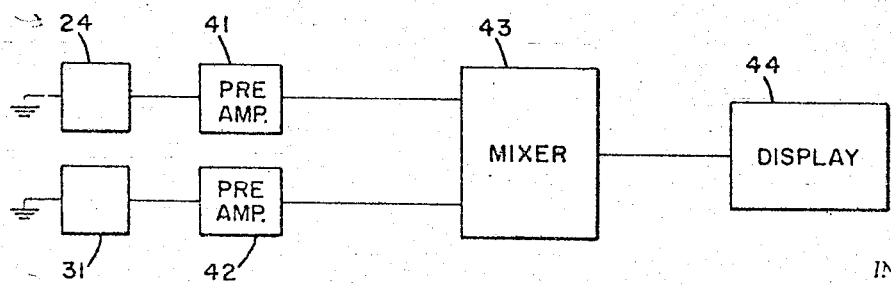
FIG. 5 is a circuit diagram for using the invention.

The circuit of FIG. 5 is merely illustrative and consist of the sensing elements 24 and 31 having one face grounded and the other face connected through amplifying circuits 41 and 42 to a mixing circuit 43 and then to a display device 44, all of elements which are conventional.

Obviously, many modifications and variations of the present invention are possible in the light of the above teachings. It is therefore to be understood that within the scope of the appended claims the invention may be practiced otherwise than as specifically described.

What is claimed is:
1. A mechanical impedance device comprising:
a hollow cylindrical body member;
first flexible means connected to one end of said body member for attaching said device to a source of vibratory force;
second means comprising flexible body means connected to the other end of said body member and oriented for flexibility in the direction of the axis of the body member, for flexing responsive to vibratory force applied to said body member, said second means attaching said device to a specimen under test;
first flexible sensing means mounted on and mechanically coupled to said first flexible means for measurably sensing the acceleration produced by the applied force;
second flexible sensing means of smaller diameter than the inner diameter of said hollow cylindrical body member and mounted on and mechanically coupled to said second means for measurably sensing thru flexure with said second body means, the magnitude of the force applied;
said acceleration and force sensing means being axially aligned and impedance matched to have substantially the same time constants;
whereby the mechanical impedance of the specimen may be determined.

2. A device as claimed in claim 1 in which said first flexible means for attaching the device includes an end closure for said body member of said device.

3. An impedance device as claimed in claim 2 in which said first flexible means for sensing the acceleration comprises:
a disc member having a counter bore in one face thereof, said counter bore being centrally located with respect to the periphery of said disc;
a pedestal member interconnecting said disc and said end closure;
said pedestal member having a cross sectional area much smaller than the corresponding cross-sectional area of said disc; and
a piezoelectric element mounted in said counter bore for sensing strains produced by acceleration axial to said pedestal.

4. A device as claimed in claim 3 in which the disc has:
radial slots extending from said counter bore to the periphery of said disc to increase the sensitivity to bending.

5. A device as claimed in claim 2 in which said flexible body means for coupling said device to a specimen includes a second end closure for said body member.

6. A device as claimed in claim 5 in which said force sensing means comprises:
a counter bore in the center of said second end closure; and
a piezoelectric sensing element mounted in said counter bore for flexing with said second end closure in response to the applied vibratory force.

7. A device as claimed in claim 1 in which said body member has a conductive web member spaced from each end of the cylinder for electrostatically isolating said acceleration sensing means and said force sensing means from each other.

References Cited
UNITED STATES PATENTS

| | | | |
|---|---|---|---|
| 3,070,996 | 1/1963 | Schloss et al. | 73—67.1 |
| 3,075,099 | 1/1963 | Shoor | 310—8.4 |
| 3,093,759 | 6/1963 | Orlacchio | 310—8.4 |

RICHARD C. QUEISSER, *Primary Examiner.*

J. P. BEAUCHAMP, *Assistant Examiner.*